HOT-BOX DETECTOR

Filed June 13, 1958

INVENTOR
CORNELIUS A. GALLAGHER
BY
Mitchell & Bechert
ATTORNEYS

United States Patent Office 3,028,484
Patented Apr. 3, 1962

3,028,484
HOT-BOX DETECTOR

Cornelius A. Gallagher, Hicksville, N.Y., assignor to Servo Corporation of America, New Hyde Park, N.Y., a corporation of New York Filed June 13, 1958, Ser. No. 741,878
5 Claims. (Cl. 246—169)

This invention relates to track-side mounted hot-box detector equipment, for use in detecting overheated journal conditions; and more particularly, to equipment for multiplexing over a single channel heat-signal information of journals on both sides of a train.

In the conventional heat detecting systems, detectors are mounted on both sides of a railroad track for detecting heat conditions of journals on opposite sides of the train. The infrared radiations detected by the respective detectors are applied over separate channels to individual circuit equipments for converting this information into telemetering signals. In most installations gating circuits are provided to pass the heat-signal information during predetermined intervals; the gating circuits being operated by wheel-trip devices. A wheel-trip device is a wired magnet, mounted adjacent the track, and is capable of producing a pulse when a railroad wheel passes thereover. Conventionally, a first wheel-trip "opens" the gate and a second wheel-trip "closes" the gate. Thus, if the detectors are staggered on opposite sides of the track four wheel-trip devices would be required to operate two gate circuits, to pass the heat information of journals on opposite sides of the train.

The two channels, over which the heat information from the respective detectors is transmitted, are substantially duplicative of each other and, therefore, considerable effort has been made to multiplex the heat signal information onto a single channel.

Accordingly, it is a primary object of this invention to conserve channel equipment by multiplexing the information from both detectors over a single channel.

It is a further object of this invention to reduce the number of wheel-trip devices required in operating the gating circuits.

In accordance with a broad aspect of this invention, there is provided a railroad hot-box detecting system comprising first and second means adapted to be mounted on opposite sides of a track respectively for detecting infrared radiations from journal boxes on opposite sides of a train; the detecting means being capable of producing signals corresponding to the intensity of radiations. The invention is characterized by time multiplexing the signals from the detecting means over a single communications channel to telemetering equipment, for indicating the heat condition of the journals.

In accordance with another aspect of the invention, only three wheel-trip devices are employed instead of the conventional four. Since only one channel is used, the intermediate wheel-trip device provides a signal which "closes" one gate and "opens" the other.

Other objects and various further features of novelty and invention will be pointed out or will occur to those skilled in the art by a reading of the following specification in conjunction with the accompanying drawings. In said drawings, which show, for illustrative purposes only, preferred forms of the invention:

FIGS. 3A and 3B show two forms of signals which may be developed by the detectors for application to the telemetering circuits.

Figures 1, 2, 2A, 3:
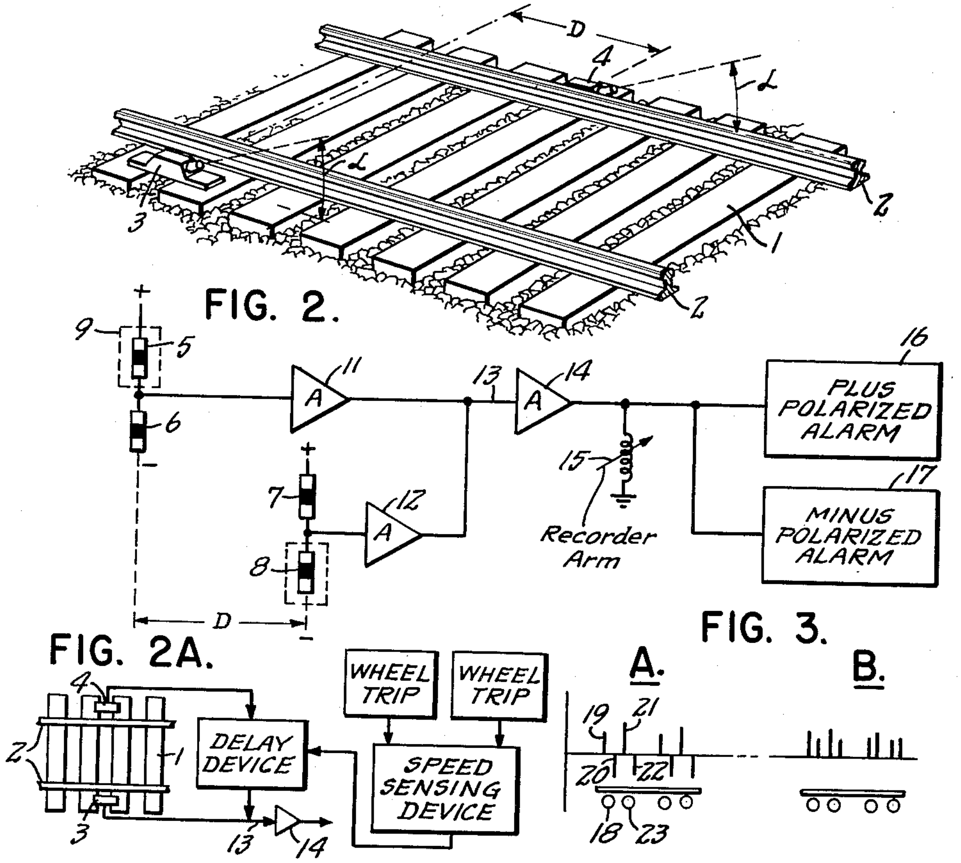
FIG. 1 is a fragmentary perspective view of a section of track, including a pair of detectors.
FIG. 2 is a schematic diagram of one embodiment of the invention in which gating circuits are not employed.
FIG. 2A is a top plan view of a section of track, and schematically illustrated circuitry of an alternative embodiment of the invention.

Referring first to FIG. 1, there is illustrated a section of track, including railroad ties 1 and a pair of tracks 2. Infrared radiation detectors 3, 4 are located alongside the track either on or between adjacent ties 1 and longitudinally offset by a predetermined distance, indicated at D. The detectors, preferably, "observe" the journals at an angle of between 15° and 35° with the track, shown in FIG. 1 as $\alpha$.

A suitable infrared radiation detector unit is described and claimed in copending application, Serial No. 620,703, filed November 6, 1956, and now abandoned, for Hot-Box Detector. Briefly, a detector unit as illustrated at 3 and 4 comprises a thermistor bolometer and a pre-amplifying unit.

The thermistor bolometer, shown diagrammatically in FIG. 2, comprises two electrical resistance units 5, 6, made of material having a negative coefficient of resistance. The units 5, 6 of one bolometer and 7, 8 of the other bolometer are connected in respective bridge circuits suitably biased as indicated by voltage polarity sign (+) and (−). One of the resistance units in each of the bolometers is shielded, as indicated at 9, from the effects of infrared radiation, and therefore, its electrical resistance is controlled primarily by the ambient temperature.

Each bridge circuit is normally balanced. However, when the infrared radiation from the journal box falls on the unshielded unit, its resistance decreases, thus unbalancing the bridge. The resultant signals, which are proportional to the amount of heat energy falling on the unshielded units, are applied to respective pre-amplifiers 11, 12.

The sense of the output signals from the bolometers is determined by the direction of biasing potential applied to the terminals of the bolometer. As shown in FIG. 2, the direction of biasing potential is opposite for the two bolometers and, therefore, the signals developed thereby will have opposite polarities.

In accordance with an aspect of the invention, the detectors are longitudinally offset, along the track, so that the journals for opposite wheels of a pair are observed by the detectors at different instants of time. The signals, therefore, produced by the detectors are applied to a communications channel 13 in time sequence; the separation between signals being determined by the distance D and the speed of the train. Since the signals from the respective detectors are time-displaced, they may be conveniently multiplexed onto the single channel 13; preferably the distance D is about one-half the wheelbase of a freight-car truck, so that video pulses derived from detector 3 cannot be confused with pulses derived from detector 4.

It is to be realized, of course, that the time displacement may be achieved by means other than the disclosed physical arrangement of the detectors. For example, if it were desired to maintain the detectors in alignment, a time delay device or frequency conversion device may be inserted in the output connection of one of the detectors.

An embodiment disclosing a time-delay device in the output of one of the detectors is shown in FIG. 2A. In order to avoid any ambiguity which may result from having a fixed delay, a variable time delay device is provided under control of a speed sensing device, the delay being shorter, the faster the train. As shown, the speed sensing device is operated by a pair of wheel-trip devices, separated by a known distance. In this case again, the preferred delay for the video output of detector 4 (as compared with that for detector 3) is preferably such as to achieve an effective spacing D between outputs of detectors 3—4 such that no confusion results, regardless of detected train speed. The wheel-trips are preferably of the magnetic variety, as referred to more particularly at 24—25 in connection with FIGURE 4.

The multiplexed signals are then applied to an amplifier 14 and the amplified signals are applied to telemetering equipment, shown diagrammatically. The telemetering equipment comprises a recording device 15 and alarm circuits 16 and 17. For the illustrated embodiment, the circuits 16, 17 are polarized, to respond to the respective signals from the detectors.

The signals shown in FIGURE 3A correspond to those produced by the circuit illustrated in FIG. 2. In FIGURES 3A and 3B a train car is sketched to show the time relationship between the signals and the journals on the opposite sides of the car. For example, for the pair of journals adjacent the opposite wheels 18, positive pulse 19 and negative pulse 20 are produced; similarly pulses 21 and 22 represent the signals for the radiations from the journal bearings for the wheel pair 23, and so forth.

FIG. 3B represents pulses of single polarity which would be produced by the detectors, if both detectors were biased in the same direction. The pulse pairs may, for example, be applied to a circuit responsive to either of the pulses which exceeds a given amplitude, indicating a dangerous journal condition.

In some situations it is advisable to "pass" or "gate" the detected radiation signals only at predetermined intervals, e.g., when the image of the detector traverses predetermined areas of the journal box. One embodiment providing this gating function is illustrated in FIG. 4.

Figure 4:
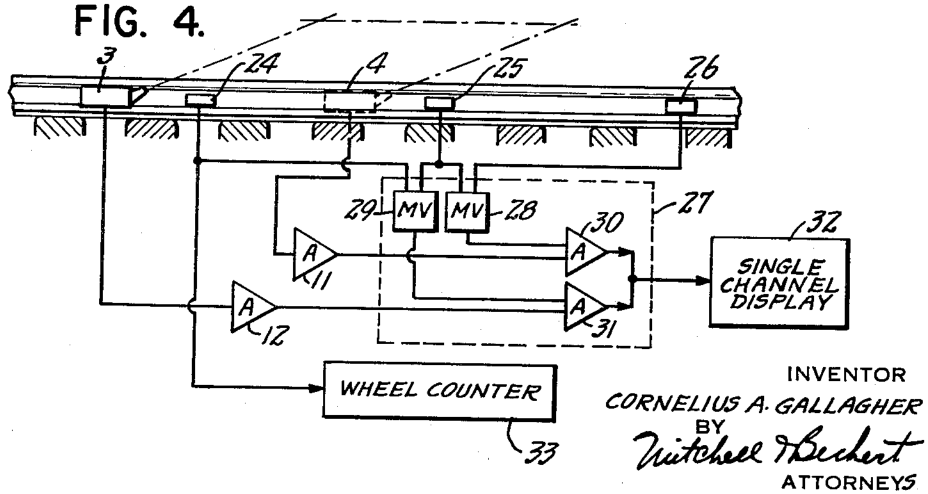
FIGS. 4 is a side elevation of a section of track including detectors, wheel-trip devices, and schematically illustrated circuitry.

In FIG. 4, the detectors bear the same reference characters as in FIG. 1; detector 4 being on the remote side of the far track, and shown by dotted lines.

A plurality of wheel-trip devices 24, 25 and 26, shown by block diagram, respectively produce electrical signals when a wheel passes thereover. One suitable wheel-trip device is disclosed in copending application Serial No. 670,220, filed July 5, 1957, for Railroad Wheel-Trip.

As will be explained hereinafter, the signals from the wheel-trip devices serve to "open" the gate, whereby radiation signals may be applied to the telemetering equipment.

The wheel-trip devices are so disposed relative to the detectors 3 and 4 that as one wheel passes over wheel-trip 24, an image of detector 3 begins to traverse a given area of the journal box adjacent that wheel. The desired area of the journal box is traversed by the detector image during the passage of the wheel from wheel-trip 24 to wheel-trip 25. Similarly, the journal box located at the opposite end of the axle is observed by detector 4 while the wheel passes between wheel-trips 25 and 26. It is, of course, preferable for the same general area of each journal box to be traversed by the detector image. To accomplish this, the wheel-trip devices should be evenly spaced.

The wheel-trip devices 24, 25 and 26 are connected to a gating circuit 27. The gating circuit comprises a pair of bistable multivibrators 28, 29, and a pair of coincidence amplifiers 30, 31, connected to the output sides of the multivibrators respectively. The multivibrator 29 is initially biased so that a signal from wheel-trip device 24 causes the multivibrator to produce an output, and a signal from wheel-trip device 25 cuts the multivibrator off. Similarly, multivibrator 28 is biased so that a signal from wheel-trip device 25 causes it to produce an output and a signal from device 26 cuts it off. Coincidence tubes 30 and 31 are conventional and conduct only when coincident input signals are applied thereto. Thus, the passage of a car wheel from wheel-trip 24 to wheel-trip 25 causes the conduction of tube 31 and the passage of the wheel from wheel-trip 25 to wheel-trip 26 causes the conduction of tube 30. The amplitude of the output from the tubes 30 and 31 is proportional to the intensity of infrared radiation detected by the detectors 3 and 4 respectively.

The signals from the gating circuit 27 are applied, for example, to a single channel display device 32, which may be a recorder, oscilloscope, or other form of telemetering circuit.

If desired, the output from one of the wheel-trip devices, e.g., 24, may also be utilized to operate a wheel counter 33.

If the detectors are of a type employing shutter mechanisms, the signals from the wheel-trip devices may be utilized to open and close the shutter. Such shutter mechanisms will be utilized in place of the gating circuit.

The invention has particular utility in connection with freight cars. Most freight cars employ a truck wheelbase of 5½ feet. Considering the detector observation angle and the probability of ambiguity, by two wheels going over two trip devices simultaneously, the most desirable separation of adjacent wheel-trip devices is one-half the wheelbase for a given observation angle.

It should be apparent now, that the most significant advantages achieved by the invention are the ease in reading and comparing signals, and the conserving of recording equipment by utilizing only a single channel.

While the invention has been described in detail for the preferred forms shown, it will be understood that modifications may be made within the scope of the invention as defined in the claims which follow.

I claim:

1. A railroad hot-box detecting system, comprising a section of railroad track, first and second infrared radiation detectors mounted on opposite sides of the track and oriented to receive radiations primarily from journal boxes or axles on opposite sides of a train respectively, each detector including a radiation-sensitive element producing an electrical signal in response to incident radiation, each detector further including an optical system positioned with respect to the detector element so that an image of the detector element traverses a given area of a journal box or axle end during a predetermined interval of time, the image axis of each optical system forming an acute angle with the track, said first and second detectors being mounted at locations alongside the track that are longitudinally offset with respect to each other by an amount substantially less than the standard wheelbase of a freight-car truck, means including a single communication channel connected respectively to the electrical output sides of said detector elements, and indicator means connected to said single communication channel and responsive to detector-element signals on said channel for indicating the heat condition of passing journal boxes or axle ends, whereby regardless of the speed of passage of a train past said detecting system heat signals produced by one of said detectors will be interlaced with corresponding heat signals produced by the other of said detectors.

2. The system according to claim 1, wherein said first detector means comprises means for producing signals of a first polarity and said second detector means comprises means for producing signals of opposite polarity.

3. The system according to claim 1, and including gating means coupling said first and second infrared radiation detectors to said single communication channel, said gating means including wheel-trip devices mounted alongside the track and adapted to be operated by the passage of a wheel thereover, one of said wheel-trip devices being so located along the track with respect to one of said detectors as inherently to gate a journal-box signal from said one detector to said channel, and a second of said wheel-trip devices being similarly located along the track with respect to the other of said detectors to gate a journal-box signal from the other detector to said channel.

4. The system according to claim 3, wherein said wheel-trip devices are separated longitudinally along the track by substantially half the wheelbase of a standard freight-car truck.

5. A railroad hot-box detecting system comprising a section of railroad track, first and second infrared radiation detectors mounted on opposite sides of said track and oriented to receive radiations primarily from journal boxes or axles on opposite sides of a train respectively, one of said detectors being located longitudinally forward of the other by an amount approximating one half the wheelbase of a standard freight-car truck, whereby the radiations from opposite ends or journal boxes for each passing axle are detected in time sequence by said detectors, a plurality of wheel-trip devices mounted on said track for producing respectively electrical signals when wheels of a railroad car pass thereover, the wheel-trip devices being disposed relative to said detectors so that during the time one wheel passes between first and second successive devices an image of one detector traverses a given area of a journal box or axle adjacent that wheel and during the time the opposite wheel passes between second and third successive devices, an image of the other detector traverses a given portion of a journal box or axle adjacent said opposite wheel, a gating circuit connected to the output sides of said detectors and said wheel-trip devices and capable of passing signals corresponding to the intensity of said radiation only during the periods when said one wheel passes between said first and second devices and said opposite wheel passes between said second and third device, infrared signal indicating means for indicating the intensity of radiation from said journals, and a single channel connecting said gating circuit to said infrared indicating means, whereby the signals from said detectors are multiplexed on said channel in time sequence.

References Cited in the file of this patent

UNITED STATES PATENTS

| | | |
|---|---|---|
| 1,837,113 | Cheney | Dec. 15, 1931 |
| 2,489,253 | Andre | Nov. 29, 1949 |
| 2,568,538 | Brailsford et al. | Sept. 18, 1951 |
| 2,647,996 | Greenfield | Aug. 4, 1953 |
| 2,659,082 | Pearson | Nov. 10, 1953 |
| 2,700,149 | Stone | Jan. 18, 1955 |
| 2,706,810 | Jacobsen | Apr. 19, 1955 |
| 2,729,809 | Hester | Jan. 3, 1956 |
| 2,818,508 | Johanson et al. | Dec. 31, 1957 |
| 2,829,267 | Howell | Apr. 1, 1958 |
| 2,856,539 | Orthuber et al. | Oct. 14, 1958 |

FOREIGN PATENTS

| | | |
|---|---|---|
| 128,537 | Australia | July 28, 1948 |
| 1,097,934 | France | Feb. 23, 1955 |

OTHER REFERENCES

How to Pinpoint Hot Boxes in April 1, 1957, edition of Railway Age, pages 47, 48 and 49.

S.H.A. (II), German application 1,002,381, printed February 14, 1957 (Kl. 20h).

S.H.A. (I), German application 1,031,338, printed June 4, 1958 (Kl. 20h 1).